United States Patent
Bhasin et al.

(10) Patent No.: US 7,580,840 B1
(45) Date of Patent: Aug. 25, 2009

(54) SYSTEMS AND METHODS FOR PERFORMANCE TUNING OF SPEECH APPLICATIONS

(75) Inventors: Vishal Bhasin, Irvine, CA (US); Parind Surendra Poi, Irving, TX (US); Arjun Shreeram Cholkar, Allen, TX (US); Kamil Mostafa Hajji, Irving, TX (US); Ramesh Babu Mucharla, Irving, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 810 days.

(21) Appl. No.: 10/747,749

(22) Filed: Dec. 29, 2003

(51) Int. Cl.
*G10L 21/00* (2006.01)
(52) U.S. Cl. ............... 704/270.1; 704/270; 704/257
(58) Field of Classification Search ............ 704/275, 704/231, 257, 270, 272, 251, 255, 271, 274, 704/273, 243, 244, 245, 270.1, 9
See application file for complete search history.

(56) References Cited

U.S. PATENT DOCUMENTS

| | | | |
|---|---|---|---|
| 6,415,257 B1* | 7/2002 | Junqua et al. | 704/275 |
| 6,785,647 B2* | 8/2004 | Hutchison | 704/231 |
| 7,103,542 B2* | 9/2006 | Doyle | 704/231 |

* cited by examiner

*Primary Examiner*—Huyen X. Vo

(57) ABSTRACT

A system (140) aids in the tuning of one or more speech applications. The system (140) may receive event data associated with multiple user interactions with one or more speech applications and store the event data in a database (310). In a real time mode, the system (140) may receive a request for information, retrieve event data from the database (310) based on the request, formulate a response to the request using the retrieved event data, and present the response to aid in the tuning of the one or more speech applications. In a periodic mode, the system (140) may periodically analyze the event data to identify potential problem areas, generate results of the periodic analyzing, and present the results to aid in the tuning of the one or more speech applications.

23 Claims, 4 Drawing Sheets

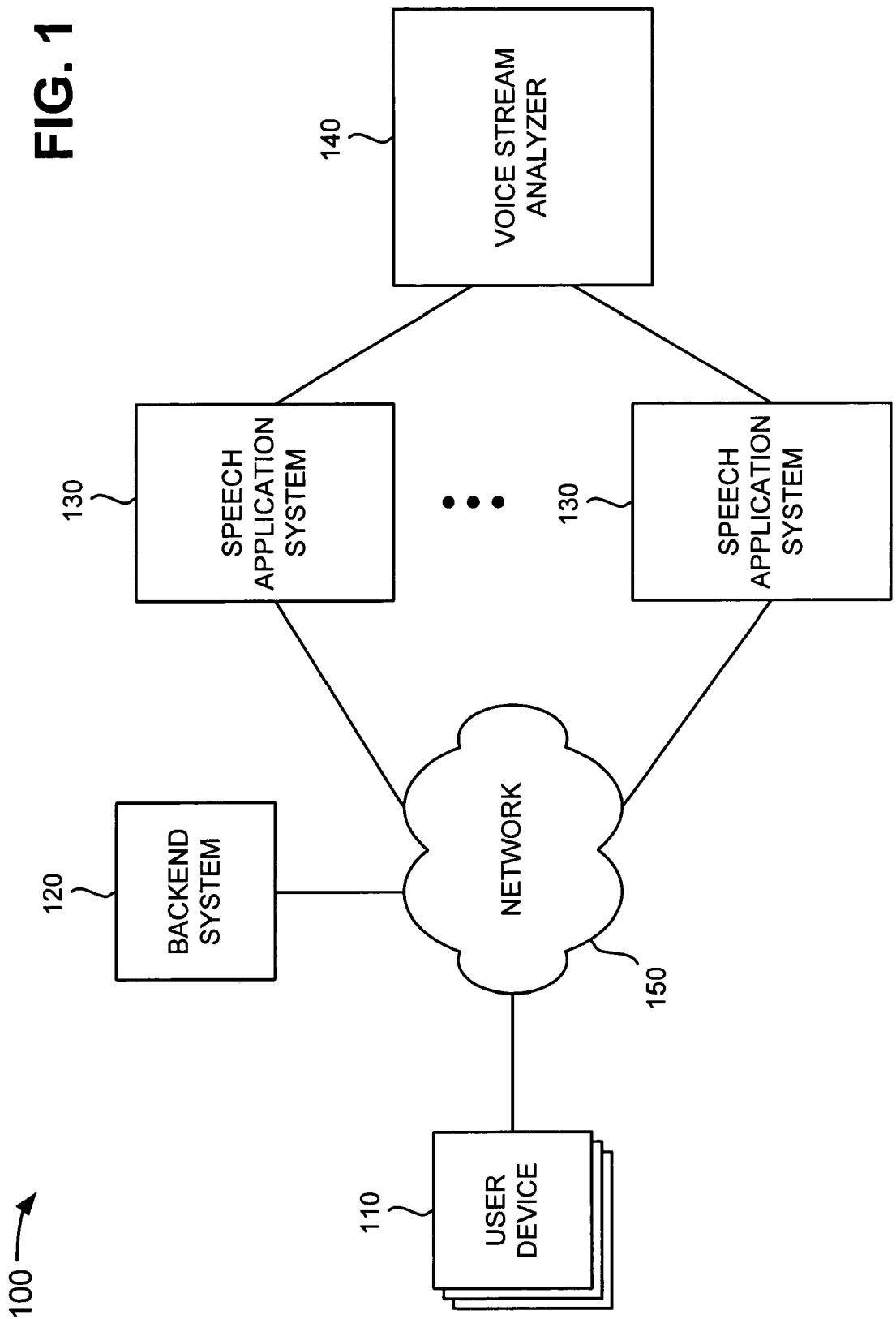

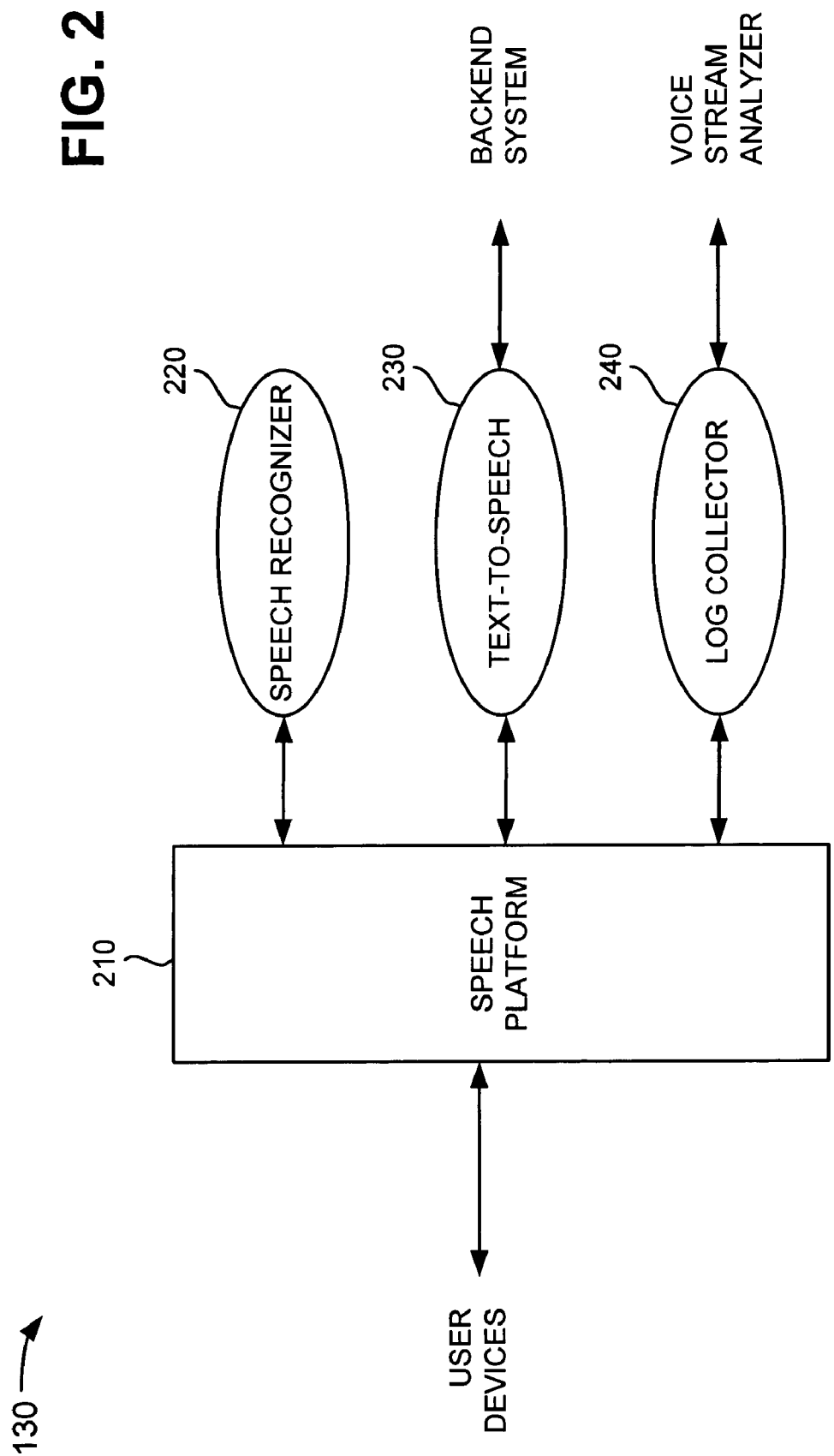

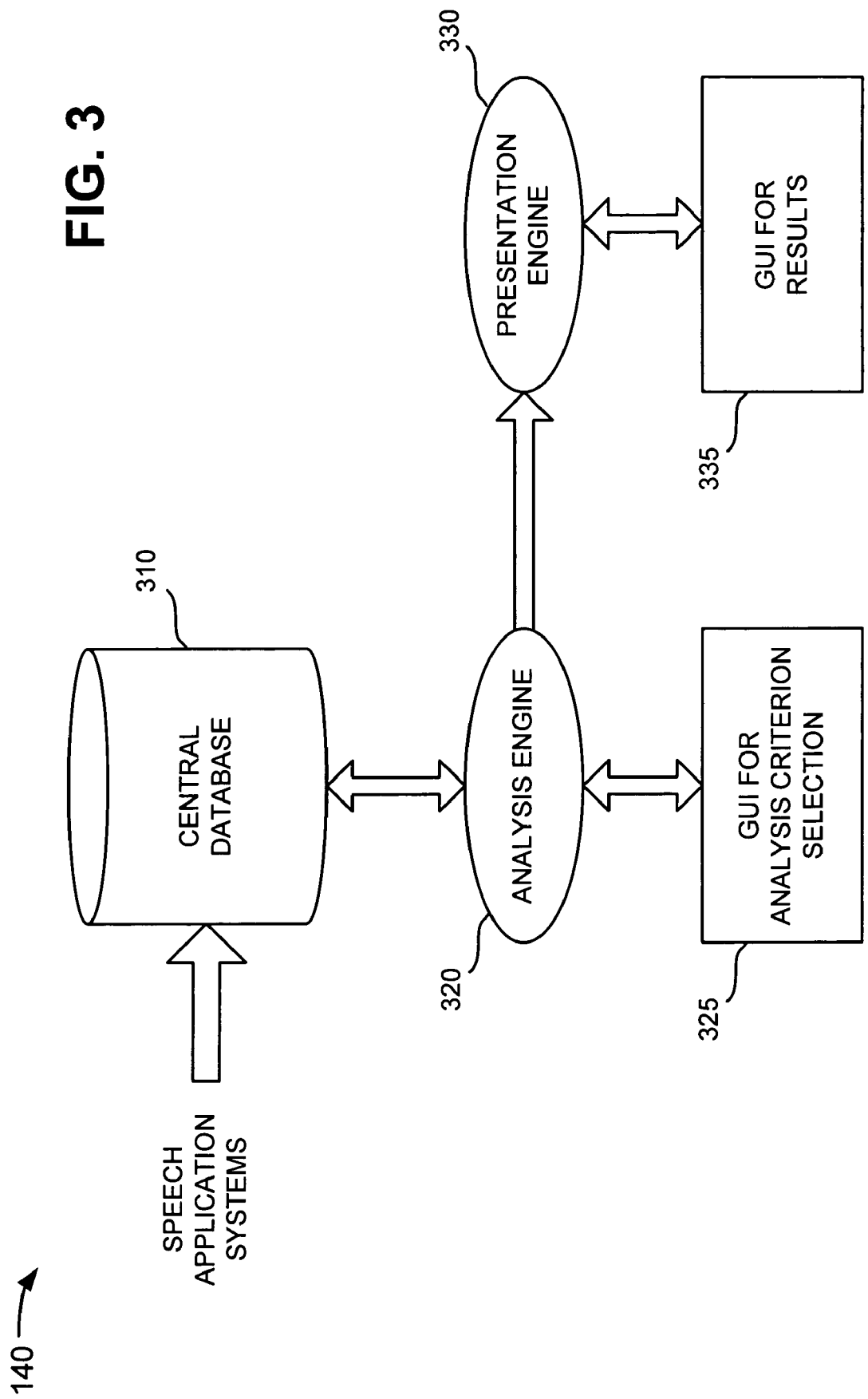

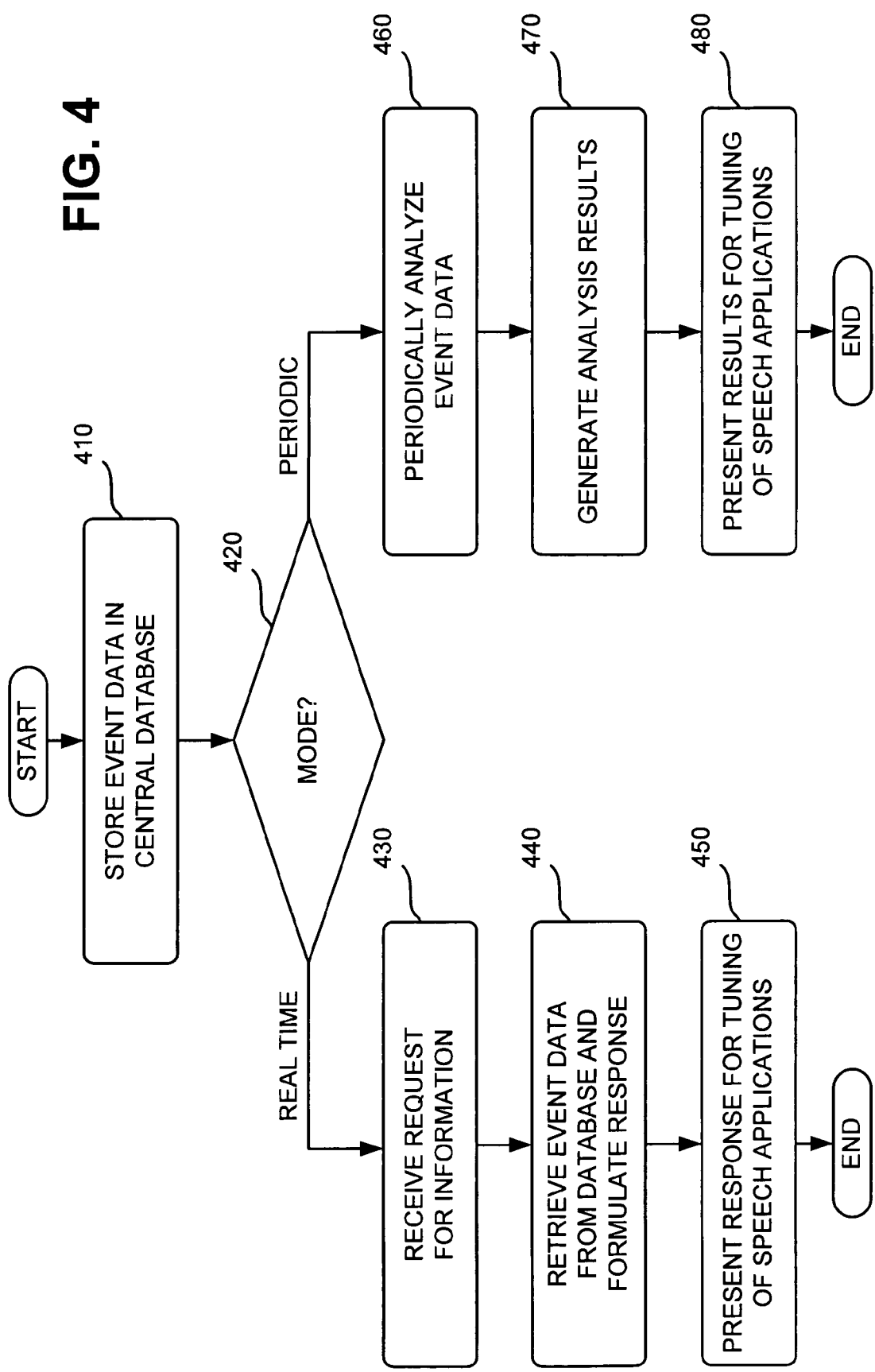

SYSTEMS AND METHODS FOR PERFORMANCE TUNING OF SPEECH APPLICATIONS

BACKGROUND OF THE INVENTION

1. Field of the Invention

The present invention relates generally to speech communication and, more particularly, to systems and methods for performance tuning speech applications.

2. Description of Related Art

Speech application systems, such as interactive voice response systems, have become commonplace. A typical speech application system includes speech recognition and speech synthesis sub-systems. A typical speech application includes a series of request-response elements between a user and the speech application system. The response elements are derived from an array of categories, modules, and events based on the requirements of the speech application.

Speech application developers use tools provided by the vendors of the speech application systems for which the speech applications are being developed. These tools are usually very vendor specific. As a result, they are inefficient and do not capture data regarding performance of distributed speech applications.

As a result, there exists a need for mechanisms that capture data regarding performance of speech applications and present this data in a form easily understood by a system engineer to facilitate performance tuning of the speech applications.

SUMMARY OF THE INVENTION

Systems and methods consistent with the principles of the invention address this and other needs by providing a voice stream analyzer that gathers data regarding performance of distributed or clustered speech applications, analyzes the data, and presents the data in a form easily understood by a system engineer to facilitate performance tuning of the speech applications.

In one aspect consistent with the principles of the invention, a method for aiding in the tuning of one or more speech applications is provided. The method may include receiving event data associated with multiple user interactions with one or more speech applications and storing the event data in a database. The method may also include receiving a request for information, retrieving at least a portion of the event data from the database based on the request, formulating a response to the request using the retrieved event data, and presenting the response to aid in the tuning of the one or more speech applications.

In another aspect, a system for aiding in the tuning of one or more speech applications associated with multiple distributed speech application systems is provided. The system may include a database that is configured to store event data associated with multiple user interactions with the multiple speech application systems. The system may also include an analysis engine that is configured to periodically analyze the event data in the database to identify potential problem areas associated with the user interactions and present results of the analysis to aid in the tuning of one or more of the speech applications.

BRIEF DESCRIPTION OF THE DRAWINGS

The accompanying drawings, which are incorporated in and constitute a part of this specification, illustrate the invention and, together with the description, explain the invention.

In the drawings,

FIG. 1 is a block diagram of an exemplary network in which systems and methods consistent with the principles of the invention may be implemented;

FIG. 2 is an exemplary functional diagram of a speech application system of FIG. 1 according to an implementation consistent with the principles of the invention;

FIG. 3 is an exemplary functional block diagram of the voice stream analyzer of FIG. 1 according to an implementation consistent with the principles of the invention; and FIG. 4 is a flowchart of exemplary processing for analyzing speech application performance to facilitate the tuning of one or more speech applications according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention provide a voice stream analyzer that gathers data regarding performance of distributed or clustered speech applications, analyzes the data, and presents the data in a form easily understood by a system engineer to facilitate performance tuning of the speech applications.

Exemplary Network Configuration

FIG. 1 is a diagram of an exemplary network 100 in which systems and methods consistent with the principles of the invention may be implemented. Network 100 may include user devices 110 connected to one or more backend systems 120, one or more speech application systems 130, and a voice stream analyzer 140 via a network 150. Network 150 may include a local area network (LAN), a wide area network (WAN), a telephone network, such as the Public Switched Telephone Network (PSTN), an intranet, the Internet, a different type of network, or a combination of networks.

User devices 110, backend system 120, speech application system(s) 130, and voice stream analyzer 140 may connect to network 150 via wired, wireless, and/or optical connections. While multiple user devices 110 and speech application systems 130 and a single backend system 120, voice stream analyzer 140, and network 150 are shown in FIG. 1, a typical network 100 may include more or fewer user devices, backend systems, speech application systems, voice stream analyzers, and networks.

User devices 110 may include telephone devices, such as wireline and/or wireless telephones (e.g., cellular telephones), personal computers, personal digital assistants (PDAs), and/or other types of devices by which users may communicate. A user may use user device 110 to communicate with a speech application system 130.

Backend system 120 may include a computer or database system that maintains information regarding users of user devices 110. The particular information that backend system 120 maintains may depend on the particular environment in which speech application systems 130 are used. For example, if speech application systems 130 are associated with a banking environment, then backend system 120 may maintain user account information. In one implementation, a single backend system 120 may service multiple speech application systems 130. In another implementation, a different backend system 120 may service each of speech application systems 130.

Speech application systems 130 may interact with user devices 110 to receive and provide information. For example, speech application systems 130 may receive speech and/or non-speech data from user devices 110 and provide speech and/or non-speech data to user devices 110. Speech application systems 130 may be associated with different vendors and different backend systems 120.

FIG. 2 is an exemplary functional block diagram of a speech application system 130 according to an implementation consistent with the principles of the invention. Speech application system 130 may include speech platform 210, speech recognizer 220, text-to-speech (TTS) logic 230, and log collector 240. Speech platform 210 may include a communication server that interacts with user devices 110 to facilitate communication with users. Speech platform 210 may accept speech data and non-speech data (e.g., dual tone multi-frequency (DTMF) signals) from the users.

Speech platform 210 may also include (or be associated with) a speech application that plays scripts (e.g., series of questions and/or prompts) that elicit information from users or guide the users in finding information of interest to the users. For example, speech platform 210 may operate as a state machine, providing certain questions and/or prompts in response to certain speech or non-speech data from the users. Speech platform 210 may interact with speech recognizer 220 and TTS logic 230 to recognize speech data provided by the users and provide speech and/or non-speech data to the users. Speech platform 210 may also provide the users with the option of speaking with a human agent.

Speech recognizer 220 may include a speech recognition engine that uses conventional speech recognition techniques to recognize speech data transmitted by user devices 110. TTS logic 230 may convert text data to speech data for presentation to the users. For example, TTS logic 230 may obtain text data corresponding to information of interest to the users from backend system 120. TTS logic 230 may convert the text data to speech data for presentation to the users.

Log collector 240 may capture events that occur during an interaction between a user and speech application system 130. Logged events can be broken down into four groups: recognizer, platform, dialog module (DM), and application events. Recognizer events may include low-level events that occur within speech recognizer 220 and may be logged within the log files of speech recognizer 220. Platform events may include events, such as call start and call end, and may be included in the logs of speech platform 210. DM events may be associated with reusable speech components. DM events may be used for analyzing the user interface, determining recognition accuracy, and identifying user distress rates. Application events may include high-level events that are specific to a speech application. Examples of application events may include: transactions, database hits, and transfers to human agents.

Recognizer events may be logged by speech recognizer 220 in its own log files. Recognizer events may include low-level events, such as the beginning of speech time, the end of speech time, the beginning of recognition time, and the end of recognition time. Speech recognizer 220 may write all of these events to a single log file. Alternatively, speech recognizer 220 may separate events into multiple log files. In any case, speech recognizer 220 may provide the log file(s) to log collector 240.

Platform events, such as call start and call end and other call control functions, may be logged by speech platform 210 in the log files of speech platform 210. Log collector 240 may include these events in the same log files with DM and application events. Log collector 240 may use these events to mark the beginning and end of particular calls.

The term "dialog module" may mean a reusable section of call flow that handles the acquisition of a particular type of data, including: (a) an initial attempt to collect the data, (b) any retries due to low accuracy ratings, (c) any confirmations for non-positive results, and (d) any time-outs due to the absence of input. A "step" can be defined as the context surrounding a single recognition of speech.

There are three DM events that are logged to emulate simplified logging: (1) DialogModule Start, (2) DialogModule End, and (3) Step End. DialogModule Start and End may be logged at the entry and exit of a dialog module. A Step End may be logged after each utterance captured by speech platform 210, whether the utterance is recognized or not. These events may be logged by including <log> tags at the appropriate points within the log file.

Some dialog modules, or speech components, may interact with a user. Some of these dialog modules may include modules that collect an address, a date, a string of digits, or a generic piece of data. Other dialog modules may confirm a date entry, a generic entry, or an address entry. Yet other dialog modules may play a set of prompts. Other dialog modules may obtain data from backend system 120, but may not contain any user interface interactions.

Application level events may be included in the log files of speech platform 210. Speech platform 210 may combine the application level events with the platform and DM events. Speech platform 210 may include transaction and sub-transaction events as events logged at the application level. Other types of application events may include transaction completion, database queries, and transfers to human agents.

Transfer and disconnect events may be logged as dialog module events since users can request a transfer or hang up at any time. Each dialog module may capture the context of that point (transfer or disconnect) in the call flow and log it before further processing takes place. In other words, the dialog module may be responsible for handling these events, logging the appropriate data, setting the appropriate return values, and returning control to the calling module.

Log collector 240 may gather data regarding these events and organize them as log entries. The events of one or more log entries may be used to reconstruct the interaction between a user and a speech application system 130. A log entry may include the following fields: a timestamp, a unique call identifier, line of business, jurisdiction, transaction, module name, log flag, event name, and tokens. The timestamp field may store information generated by speech platform 210 that includes the year, month, day, hour, minute, second, and/or millisecond of the log entry. The unique call identifier field may store information generated by speech platform 210 based, for example, on the port number of the call and/or the Internet Protocol (IP) address associated with the call.

The line of business field may store information regarding a line of business designation for the call, such as "Consumer" or "Business." The jurisdiction field may store information regarding the state or country of call origin. The transaction field may store information that specifies which transaction is being handled, such as "Disconnect," "Pay Bill," "Payment Location," etc. The module name field may store information that is set as the call flow transitions between call modules. At the entry to any dialog module, the dialog module may be passed the module name as one of its input parameters. The dialog module may then append its own name to the module name.

The event name field may store information that references the various interactions that occur in speech application system 130, such as "Call Arrival," "Call End," "Backend Interaction," etc. The tokens field may store log tokens that may be associated with certain events. The log tokens may be used to indicate if a log entry may be more useful for business-related reporting or may be used for simulating an entire call for analysis. The information in the tokens field may also be used for subdividing the log entries for easier processing.

Log collector 240 may send log entries to voice stream analyzer 140 (FIG. 1). Returning to FIG. 1, voice stream analyzer 140 may store the log entries, analyze them, and present data regarding them in a form easily understood by a system engineer to facilitate performance tuning of speech application systems 130.

FIG. 3 is an exemplary diagram of voice stream analyzer 140 according to an implementation consistent with the principles of the invention. Voice stream analyzer 140 may include central database 310, analysis engine 320, and presentation engine 330. Database 310 may include one or more memory devices that store the log entries from speech application systems 130. Database 310 may store the log entries as event data in a text and/or audio format that is easily searchable and retrievable.

The event data may include information associated with anything that the users did while the users were interacting with speech application systems 130. The event data may include, for example, information regarding the data entered by the users, the scripts played to the users, the users' utterances, what the users requested, whether users' requests could be identified, whether there were any time-outs, whether the users requested a human agent, etc.

Analysis engine 320 may analyze the event data in database 310 in either real time (e.g., when requested by a system engineer) or periodically (e.g., daily, weekly, etc.). When operating in the real time mode, analysis engine 320 may interact with a system engineer via a graphical user interface 325 to obtain a request for information from the system engineer. The system engineer may request various information from database 310, such as statistics and other information concerning interactions between users and one or more speech application systems 130. For example, the system engineer may request information regarding how many users did not speak at a particular point during an interaction, how many users requested a human agent at a particular point during an interaction, the particular points at which the occurrence of time-outs were frequent during an interaction, the particular points at which the occurrence of disconnects were frequent during an interaction, and other information that the system engineer may find useful in tuning speech application systems 130.

Analysis engine 320 may generate a search query, based on the request for information, to locate relevant event data in database 310. Analysis engine 320 may retrieve the relevant event data from database 310 and formulate a response to the request for information. The response may entail generating statistics from the event data or otherwise organizing the event data in the manner requested by the system engineer. Analysis engine 320 may provide the response to presentation engine 330.

Presentation engine 330 may organize the response, if necessary, and present it in a form that is easily understandable by the system engineer via graphical user interface 335. For example, presentation engine 330 may present the statistics and other information concerning interactions between users and one or more speech application systems 130, as requested by the system engineer. The system engineer may then use this information to locate problem areas and tune speech application systems 130.

When operating in the periodic mode, analysis engine 320 may periodically analyze the event data in database 310 to identify potential problem areas, such as areas where users often asked for a human agent, where users typically disconnected the call, and/or where time-outs often occurred. Analysis engine 320 may generate analysis results that it provides to presentation engine 330. The analysis results may include statistics and/or other information concerning interactions between users and one or more speech application systems 130. Presentation engine 330 may organize the results, if necessary, and present them in a form that is easily understandable by a system engineer to aid the system engineer in the tuning of one or more of speech application systems 130.

System Processing

FIG. 4 is a flowchart of exemplary processing for analyzing speech application performance to facilitate the tuning of one or more speech applications according to an implementation consistent with the principles of the invention. Processing may begin with users calling one or more speech application systems 130 (FIG. 1) using user devices 110. The users may thereafter interact with speech application systems 130. During a typical interaction, a speech application system 130 may request certain information from a user and provide certain information to the user. Speech application system 130 may also obtain certain information from backend system 120.

During these interactions, the users may have different experiences. For example, the users may select different options to obtain different types of information from speech application systems 130. Speech application systems 130 may obtain some of this information from backend system 120. Selection of these different options may also cause speech application systems 130 to request different types of information from the users. At any time during the interaction, the users may be given the option to transfer to a human agent or disconnect the call. Also, time-outs may occur. For example, a user may fail to respond to a request from a speech application system 130. As described above, these different user experiences may be called "events." A typical interaction may include one or more events.

Speech application systems 130 may record these different user experiences as log entries that contain event data representing one or more events. Speech application systems 130 may send the log entries to voice stream analyzer 140. Voice stream analyzer 140 may store the log entries in database 310 (FIG. 3) (act 410). Database 310 may store log entries from multiple speech application systems 130 that represent many user interactions.

In the real time mode, analysis engine 320 may receive a request for information from a system engineer (or another person) (acts 420 and 430). Analysis engine 320 may generate a search query based on the request and use the search query to retrieve information from database 310, such as statistics and other information concerning interactions between users and one or more speech application systems 130. For example, the system engineer may request information regarding how many users did not speak at a particular point during an interaction, how many users requested a human agent at a particular point during an interaction, the particular points at which the occurrence of time-outs were frequent during an interaction, the particular points at which the occurrence of disconnects were frequent during an interaction, and other information that the system engineer may find useful in tuning one or more of speech application systems 130.

Analysis engine 320 may use the search query to locate relevant event data in database 310 and formulate a response (act 440). When formulating the response, analysis engine 320 may generate statistics based on the event data or otherwise organize the event data to a form requested by the system engineer. Analysis engine 320 may then provide the response to presentation engine 330.

Presentation engine 330 may organize the response, if necessary, and present it in a form that is easily understandable by the system engineer (act 450). For example, presentation engine 330 may present the statistics and other information concerning interactions between users and one or more speech application systems 130, as requested by the system engineer. The system engineer may then use this information to locate problem areas and tune speech application systems 130. For example, the system engineer may determine problem areas, such as areas where users often asked for a human agent, where users typically disconnected the call, and/or where time-outs often occurred. The system engineer may also reconstruct user interactions to determine why the problems arose. The system engineer may use this information to tune one or more of speech application systems 130.

In the periodic mode, analysis engine 320 may periodically analyze the event data in database 310 without any specific request from a system engineer (act 460). In this case, analysis engine 320 may periodically analyze the event data to identify potential problem areas, such as areas where users often asked for a human agent, where users typically disconnected the call, and/or where time-outs often occurred. Analysis engine 320 may generate analysis results that it provides to presentation engine 330 (act 470). The analysis results may include statistics and/or other information concerning interactions between users and one or more speech application systems 130.

Presentation engine 330 may organize the results, if necessary, and present them in a form that is easily understandable by a system engineer to aid the system engineer in the tuning of one or more of speech application systems 130 (act 480).

CONCLUSION

Systems and methods consistent with the principles of the invention provide a voice stream analyzer that gathers data regarding performance of distributed or clustered speech application systems, analyzes the data, and presents the data in a form easily understood by a system engineer to facilitate performance tuning of the speech application systems.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

While a series of acts has been described with regard to FIG. 4, the order of the acts may differ in other implementations consistent with the principles of the invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for aiding in tuning of one or more speech applications, comprising:
   receiving event data associated with a plurality of user interactions with at least one speech application script played by the one or more speech applications;
   storing the event data in a database;
   receiving a request for information;
   retrieving at least a portion of the event data from the database based on the request;
   identifying, using a voice stream analyzer device, potential problem areas with at least one speech application script, using the retrieved event data;
   formulating a response to the request using the identified potential problem areas; and
   presenting the response to aid in improving the performance of the at least one speech application script.

2. The method of claim 1, wherein the at least one speech application script is associated with a plurality of distributed speech application systems.

3. The method of claim 1, wherein the event data includes information regarding verbal and non-verbal exchanges that occurred during users' interactions with the at least one speech application script.

4. The method of claim 1, wherein the retrieving event data includes:
   generating a search query based on the request for information, and using the search query to identify event data in the database that is relevant to the search query.

5. The method of claim 1, wherein the formulating a response includes:
   generating statistics based on the retrieved event data; and using the statistics as the response to the request.

6. The method of claim 1, wherein the formulating a response includes:
   organizing the retrieved event data to a form that satisfies the request; and
   using the organized event data as the response to the request.

7. The method of claim 1, wherein the event data includes at least one of recognizer events, platform events, dialog module events, or application events.

8. The method of claim 1, wherein the potential problem areas include where users often asked for a human agent, where users typically disconnected the call, or where time-outs often occurred.

9. The method of claim 1, wherein the speech application script comprises a series of questions and prompts provided in response to user interactions with the one or more speech applications.

10. The method of claim 9, wherein the receiving event data associated with a plurality of user interactions includes:
    playing a series of questions and prompts from the at least one speech application script that elicit information and guide in finding information of interest; and
    receiving user interactions from the series of questions and prompts including verbal and non-verbal exchanges.

11. A voice stream analyzer connected to receive event data associated with a plurality of user interactions with a plurality of speech application scripts played by a plurality of distributed speech application systems, the voice stream analyzer comprising:
    a database configured to store the event data received from the distributed speech application systems; and
    an analysis engine configured to:
       receive a request for information,
       retrieve at least a portion of the event data from the database based on the request,
       identify potential problem areas with at least one speech application script, using the retrieved event data;
       formulate a response to the request using the identified potential problem areas; and
       provide the response to aid in improving performance of at least one speech application script.

12. The voice stream analyzer of claim 11, wherein the event data includes information regarding verbal and non-verbal exchanges that occurred during users' interactions with the at least one speech application script.

13. The voice stream analyzer of claim 11, wherein when retrieving the portion of the event data, the analysis engine is configured to:
    generate a search query based on the request for information, and use the search query to identify event data in the database that is relevant to the search query.

14. The voice stream analyzer of claim 11, wherein when formulating a response, the analysis engine is configured to:
generate statistics based on the retrieved event data, and
use the statistics as the response to the request.

15. The voice stream analyzer of claim 11, wherein when formulating a response, the analysis engine is configured to:
organize the retrieved event data to a form that satisfies the request, and
use the organized event data as the response to the request.

16. The voice stream analyzer of claim 11, further comprising:
a presentation engine configured to display the response on a graphical user interface.

17. The voice stream analyzer of claim 16, wherein when providing the response, the analysis engine is configured to provide the response to the presentation engine.

18. The voice stream analyzer of claim 11, wherein the event data includes at least one of recognizer events, platform events, dialog module events, or application events.

19. The voice stream analyzer of claim 11, wherein the potential problem areas include where users often asked for a human agent, where users typically disconnected the call, or where time-outs often occurred.

20. A system for aiding in tuning of one or more speech applications, comprising:
means for obtaining event data associated with a plurality of user interactions with at least one speech application script played by a plurality of distributed speech application systems;
means for storing the event data;
means for periodically analyzing the event data to identify potential problem areas with at least one speech application script; and
means for providing results of the periodic analyzing to aid in improving the performance of the at least one speech application script.

21. A network for facilitating tuning of speech application scripts, comprising:
a plurality of distributed speech application systems; and
a voice stream analyzer connected to the speech application systems, and configured to:
obtain event data associated with a plurality of user interactions with at least one speech application script played by the speech application systems,
store the event data,
receive a request for information,
retrieve stored event data that is relevant to the request,
identify potential problem areas with at least one speech application script played by the speech application systems, using the retrieved event data;
generate a response to the request using the identified potential problem areas, and
provide the response to aid in improving the performance of the at least one speech application script.

22. A method for aiding in tuning of one or more speech applications, comprising:
receiving event data associated with a plurality of user interactions with at least one speech application script played by one or more speech applications;
storing the event data in a database;
periodically analyzing the event data using a voice stream analyzer device, to identify potential problem areas with at least one speech application script;
generating results of the periodic analyzing; and
presenting the results to aid in improving the performance of the at least one speech application script.

23. A voice stream analyzer connected to receive event data associated with a plurality of user interactions with at least one speech application script played by a plurality of speech applications from a plurality of distributed speech application systems, the voice stream analyzer comprising:
a database configured to store the event data received from the distributed speech application systems; and
an analysis engine configured to:
periodically analyze the event data in the database to identify potential problem areas with at least one speech application script associated with the user interactions, and
provide results of the periodic analysis to aid in improving performance of the at least one speech application script.

* * * * *